Patented Aug. 6, 1929.

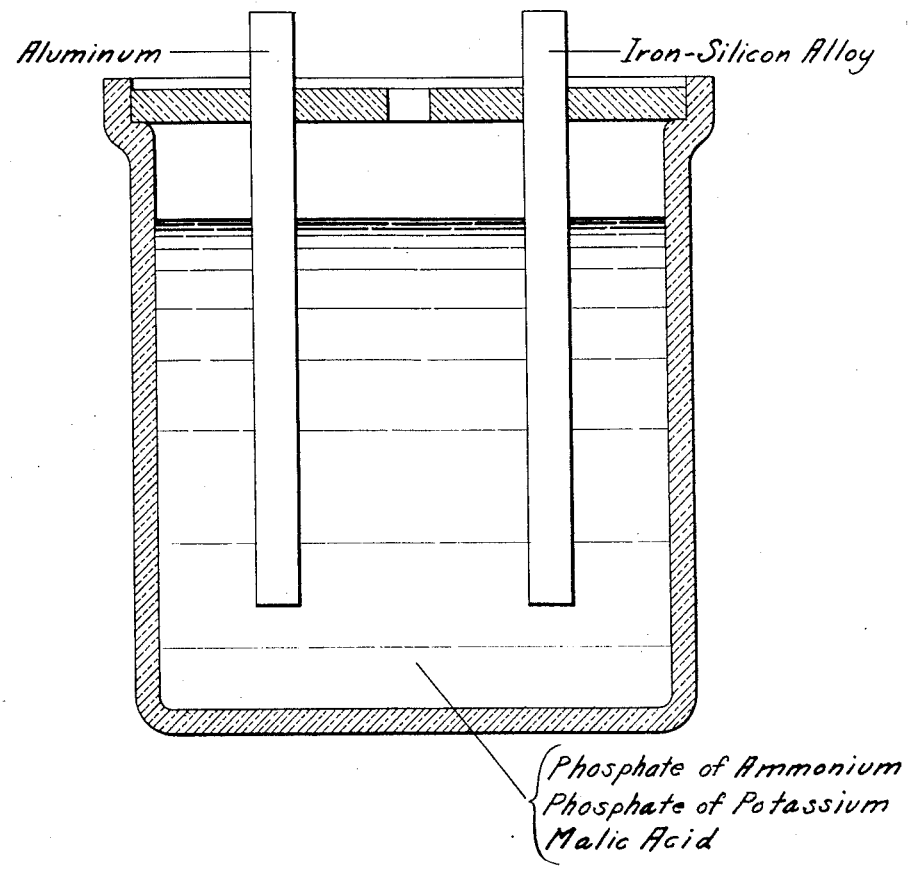

1,723,154

UNITED STATES PATENT OFFICE.

WILLIAM H. GRIMDITCH, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

ELECTROLYTIC CELL AND SOLUTION THEREFOR.

Application filed March 18, 1925. Serial No. 16,578.

This invention relates to electrolytic rectifiers, condensers and the like, and the principal object of the invention is to provide a novel electrolyte particularly desirable for use with aluminum or other film-forming electrodes, which shall be generally more efficient than electrolytes heretofore employed.

A more specific object of the invention is to provide an asymmetric cell having relatively high current capacity and long life, and which for a given rate of current flow shall heat up to a lesser extent than similar cells having solutions used prior to my invention.

A further object is to provide an electrolyte having a minimum corrosive effect upon the aluminum or other electrode, and one which, even after a cell has stood for a long period without use, will quickly cause the aluminum electrode to start rectifying or become active when placed in operation.

The attached drawing illustrates diagrammatically a cell embodying the present invention.

In its preferred form the electrolyte solution contains 3% to 10% by weight of monobasic potassium phosphate, ($KH_2PO_4$), 3% to 12% of dibasic ammonium phosphate, [$(NH_4)_2HPO_4$], 3% to 15% of malic acid, and 91% to 63% of water. The proportions may vary, and I do not wish to limit myself to exact proportions.

While an electrolyte solution including all the above named ingredients in the proportions outlined has been found to afford excellent results, it will be obvious that there may be certain changes in the formula without departure from the invention. For instance, the potassium phosphate may be omitted and the dibasic ammonium phosphate alone used with malic acid. An improved electrolyte may also be made by mixing malic acid with dibasic potassium phosphate or with a mixture of tribasic potassium phosphate ($K_3PO_4$) and monobasic phosphate of either potassium or ammonium. Likewise, the mixture may consist of malic acid with dibasic potassium phosphate and monobasic ammonium phosphate, or, malic acid with dibasic potassium phosphate and dibasic ammonium phosphate. In any case, the ingredients must be so proportioned as not to have present too much of a strongly basic phosphate on the one hand or too much free acid on the other hand.

If desired, other mild organic acids, such as citric acid, may be substituted for malic acid in any of the mixtures described above.

As set forth above, the electrolyte is particularly desirable for use in connection with electrodes of aluminum, and a cell made in accordance with the invention disclosed in the application for patent of Walter E. Holland, Serial Number 612,405, filed January 13, 1923, may advantageously employ this electrolyte. This cell comprises an electrode of aluminum and another of iron-silicon alloy in which the silicon content is relatively high as compared with that of common commercial irons and steels, such for example as transformer core steel which may contain approximately 5% silicon. A preferred silicon content in the present instance is around 14%, and electrodes formed on this basis are substantially insoluble in the applicant's electrolyte solution under conditions of use.

Such a cell when supplied with a solution made in accordance with the above disclosure will operate under given conditions as to current and voltage for a longer period of time and with the development of less heat than cells made with any other solution with which I am acquainted. Also, the cell will function almost immediately when placed in use after protracted periods of idleness.

I claim:

1. An electrolyte for electrolytic rectifiers, condensers and the like including a phosphate of an alkali metal or radical and malic acid.

2. An electrolyte for electrolytic rectifiers, condensers and the like including a water-soluble phosphate and at least 3% of malic acid.

3. An electrolyte for electrolytic rectifiers, condensers and the like including a phosphate of potassium and malic acid.

4. An electrolyte for electrolytic rectifiers, condensers and the like including a phosphate of potassium, a phosphate of ammonium, and malic acid.

5. An electrolyte for electrolytic rectifiers, condensers and the like including monobasic potassium phosphate, dibasic ammonium phosphate, and malic acid.

6. An electrolyte for electrolytic rectifiers, condencers and the like including malic acid and a substance including the chemical group designated by the symbol $PO_4$.

7. An electrolyte for electrolytic rectifiers, condensers and the like including at least 3% of malic acid and a substance including the chemical group designated by the symbol $PO_4$.

8. An asymmetric cell including an aluminum electrode and a solution containing a phosphate of an alkali metal or radical and malic acid.

9. An asymmetric cell including an aluminum electrode and a solution containing monobasic potassium phosphate, dibasic ammonium phosphate and malic acid.

10. An asymmetric cell including an aluminum electrode and a solution containing a phosphate of potassium, a phosphate of ammonium, and malic acid.

11. An asymmetric cell including a solution containing a phosphate of an alkali metal or radical and malic acid, a rectifying electrode, and a second electrode of iron alloy containing at least 10% silicon.

12. An asymmetric cell including a solution containing a phosphate of an alkali metal or radical and malic acid, an aluminum electrode, and a second electrode of iron alloy containing at least 10% silicon.

13. An asymmetric cell including a solution containing a phosphate of potassium, a phosphate of ammonium, and malic acid, a rectifying electrode, and a second electrode of iron alloy containing at least 10% silicon.

14. An asymmetric cell including a solution containing monobasic potassium phosphate, dibasic ammonium phosphate and malic acid, a rectifying electrode, and a second electrode of an iron alloy containing approximately 14% silicon.

15. An asymmetric cell including a solution containing monobasic potassium phosphate, dibasic ammonium phosphate, malic acid, a rectifying electrode of aluminum, and a second electrode consisting of an iron alloy containing not less than 10% silicon.

WILLIAM H. GRIMDITCH.